(12) United States Patent
Jeong et al.

(10) Patent No.: US 9,526,077 B2
(45) Date of Patent: Dec. 20, 2016

(54) METHOD AND APPARATUS FOR REPORTING POWER HEADROOM INFORMATION IN MOBILE COMMUNICATION SYSTEM SUPPORTING CARRIER AGGREGATION

(71) Applicant: Samsung Electronics Co., Ltd., Suwon-si, Gyeonggi-do (KR)

(72) Inventors: Kyeong In Jeong, Suwon-si (KR); Sang Bum Kim, Seoul (KR); Soeng Hun Kim, Yongin-si (KR); Gert-Jan Van Lieshout, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/824,818

(22) Filed: Aug. 12, 2015

(65) Prior Publication Data

US 2015/0351053 A1    Dec. 3, 2015

Related U.S. Application Data

(63) Continuation of application No. 13/206,793, filed on Aug. 10, 2011.

(30) Foreign Application Priority Data

Jul. 26, 2011    (KR) .......................... 10-2011-0074084

(51) Int. Cl.
*H04B 7/00* (2006.01)
*H04W 52/36* (2009.01)
(Continued)

(52) U.S. Cl.
CPC ........... *H04W 52/365* (2013.01); *H04W 24/10* (2013.01); *H04W 52/34* (2013.01);
(Continued)

(58) Field of Classification Search
CPC ............. H04W 52/365; H04W 52/146; H04W 52/367; H04W 52/243; H04W 52/346; H04W 88/02; H04W 88/08
(Continued)

(56) References Cited

U.S. PATENT DOCUMENTS

2010/0080184 A1    4/2010  Tseng
2010/0158147 A1    6/2010  Zhang et al.
(Continued)

FOREIGN PATENT DOCUMENTS

KR    10-2009-0101786 A    9/2009
WO    2008050998 A1    5/2008
(Continued)

OTHER PUBLICATIONS

ZTE: "Discussion on CC specific PHR reporting", 3GPP Draft; R2-103724 Discussion on CC Specific PHR Reporting, 3RO Generation Partnership Project (3GPP), Mobile Competence Centre ; 650, Route Des Lucioles ; F-06921 Sophia-Antipolis Cedex; France,vol. RAN WG2, no. Stockholm, Sweden; 20100628, Jun. 22, 2010, XP050451199.
(Continued)

*Primary Examiner* — Shaima Q Aminzay
(74) *Attorney, Agent, or Firm* — Jefferson IP Law, LLP

(57) ABSTRACT

A method and apparatus for transmitting a power headroom (PH) report by a terminal in a mobile communication system supporting carrier aggregation are provided. The method includes determining a first maximum transmission power for a first serving cell of multiple activated serving cells based on uplink transmission of at least one other serving cell if the first serving cell transmits a physical uplink shared channel (PUSCH), determining a second maximum transmission power for a first serving cell of the multiple activated serving cells without consideration of uplink trans-
(Continued)

mission of at least one other serving cell if the first serving cell does not transmit a PUSCH, calculating a PH for the first serving cell based on the first maximum transmission power or the second maximum transmission power, and transmitting, to a base station, an extended PH report including respective calculated PHs of the multiple activated serving cells on one of the multiple activated serving cells.

20 Claims, 8 Drawing Sheets

Related U.S. Application Data

(60) Provisional application No. 61/372,452, filed on Aug. 10, 2010, provisional application No. 61/374,160, filed on Aug. 16, 2010, provisional application No. 61/383,437, filed on Sep. 16, 2010, provisional application No. 61/389,476, filed on Oct. 4, 2010, provisional application No. 61/392,436, filed on Oct. 12, 2010, provisional application No. 61/410,493, filed on Nov. 5, 2010.

(51) Int. Cl.
  *H04W 24/10* (2009.01)
  *H04W 52/34* (2009.01)
  *H04W 72/12* (2009.01)
  *H04W 52/14* (2009.01)

(52) U.S. Cl.
  CPC ..... *H04W 52/367* (2013.01); *H04W 72/1284* (2013.01); *H04W 52/143* (2013.01); *Y02B 60/50* (2013.01)

(58) Field of Classification Search
  USPC .................. 455/522, 67.11, 423, 509, 550.1, 561,455/571; 370/252, 318, 328, 329
  See application file for complete search history.

(56) References Cited

U.S. PATENT DOCUMENTS

| | | |
|---|---|---|
| 2010/0232385 A1 | 9/2010 | Hsu |
| 2010/0297993 A1 | 11/2010 | Heo et al. |
| 2011/0242972 A1 | 10/2011 | Sebire et al. |
| 2011/0292874 A1 | 12/2011 | Ho et al. |
| 2012/0093020 A1 | 4/2012 | Iwai et al. |

FOREIGN PATENT DOCUMENTS

| | | |
|---|---|---|
| WO | 2009088228 A3 | 10/2009 |
| WO | 2010065759 A2 | 6/2010 |

OTHER PUBLICATIONS

Ericsson: 11Sumnary of e-mail discussion [70#15] LTE CA: PHR Handling, 3GPP Draft; R2-103580 Summary of RAN2-70 NR 15—PHR Handling, 3rd Generation Partnership Project (3GPP), Mobile Competence Centre ; 650, Route Des Lucioles ; F-06921 Sophia-Antipolis Cedex; France, vol. RAN WG2, no. Stockholm, Sweden; 20100628-20100702, Jun. 22, 2010, XP050605219.

3GPP, 3rd Generation Partnership Project; Technical Specification Group Radio Access Network; Evolved Universal Terrestrial Radio Access (E-UTRA); Medirun Access Control (MAC) protocol specification (Release 9), 3GPP TS 36.321 V9.3.0, Jun. 2010.

MEDIATEK, Per UE PHR for carrier aggregation, 3GPP TSG-RAN WG1 Meeting #61bis, R1-103743, Jun. 28-Jul. 2, 2010.

Panasonic, Details of cross-carrier power headroom reports[online], 3GPP TSG-RAN WG2 # 70bis R2-103600, Jun. 22, 2010.

Ericsson, ST Ericsson, Details of PHR Handling for CA[online], 3GPPTSG-RAN WG2 # 70bis R2-103570, Jun. 21, 2010.

ASUSTeK, Power headroom report in LTE-A[online], 3GPP TSG-RAN WG1#61 R1-103189, May 4, 2010.

ZTE, Power Headroom Reporting for Carrier Aggregation in LTE-Advanced [online], 3GPP TSG-RAN WG1#62 R1-104675, Aug. 17, 2010.

Panasonic, Discussion on PHR [online], 3GPP TSG-RAN WG1 # 62b R1-105483, Oct. 5, 2010.

METHOD AND APPARATUS FOR REPORTING POWER HEADROOM INFORMATION IN MOBILE COMMUNICATION SYSTEM SUPPORTING CARRIER AGGREGATION

CROSS-REFERENCE TO RELATED APPLICATIONS

This is a continuation application of prior U.S. patent application assigned Ser. No. 13/206,793 filed Aug. 10, 2011, which claims the benefit under 35 U.S.C. §119(e) of a provisional patent application filed on Aug. 10, 2010 in the United States Patent Office and assigned Ser. No. 61/372,452, of a provisional patent application filed on Aug. 16, 2010 in the United States Patent Office and assigned Ser. No. 61/374,160, of a provisional patent application filed on Sep. 16, 2010 in the United States Patent Office and assigned Ser. No. 61/383,437, of a provisional patent application filed on Oct. 4, 2010 in the United States Patent Office and assigned Ser. No. 61/389,476, of a provisional patent application filed on Oct. 12, 2010 in the United States Patent Office and assigned Ser. No. 61/392,436, and of a provisional patent application filed on Nov. 5, 2010 in the United States Patent Office and assigned Ser. No. 61/410,493, and under 35 U.S.C. §119(a) of a Korean patent application filed on Jul. 26, 2011 in the Korean Intellectual Property Office and assigned Serial No. 10-2011-0074084, the entire disclosures of which are hereby incorporated by reference.

BACKGROUND OF THE INVENTION

1. Field of the Invention

The present invention relates to a mobile communication system supporting carrier aggregation. More specifically, the present invention relates to a method and apparatus for reporting Power Headroom (PH) of a User Equipment (UE) per carrier efficiently in a mobile communication system supporting carrier aggregation.

2. Description of the Related Art

Mobile communication systems developed to provide subscribers with voice communication services on the move. With the rapid advance of technology, mobile communication systems have evolved to support high speed data communication services as well as standard voice communication services.

Recently, Long Term Evolution (LTE) is under development as the next generation mobile communication system of the $3^{rd}$ Generation Partnership Project (3GPP). The LTE system is a technology for realizing high-speed packet-based communication at about 100 Mbps. A discussion is being held on several schemes for LTE, including one scheme for reducing the number of nodes located in a communication path by simplifying a configuration of the network, and another scheme for maximally approximating wireless protocols to wireless channels.

Unlike voice services, resources for data services are allocated according to the data amount to be transmitted and channel condition. Accordingly, in a wireless communication system such as a cellular communication system, a scheduler manages resources according to the resource amount, channel condition, and data amount. This is also the case in the LTE system, in which the scheduler located in the base station manages and allocates the radio resource.

Recently, LTE-Advanced (LTE-A) is actively being discussed as an evolution of LTE with new techniques to increase data rates. Carrier aggregation is one of the representative techniques that are newly adopted in LTE-A. Unlike the data communication of the related art in which a User Equipment (UE) uses a single uplink carrier and a single downlink carrier, carrier aggregation enables the UE to use multiple uplink and/or downlink carriers. Since the uplink transmission power determination algorithm is designed for the UE operating with one uplink carrier and one downlink carrier, it is difficult to apply the transmission power determination process for uplink transmission power determination of the UE supporting carrier aggregation. There is a need to define a procedure and method for reporting Power Headroom (PH) of the UE supporting carrier aggregation.

SUMMARY OF THE INVENTION

Aspects of the present invention are to address at least the above-mentioned problems and/or disadvantages and to provide at least the advantages described below. Accordingly, an aspect of the present invention is to provide a method and apparatus for reporting Power Headroom (PH) of a UE efficiently in the mobile communication system supporting carrier aggregation. An aspect of the present invention is to provide a mechanism for reporting per-carrier PHs in a Power Headroom Report (PHR) transmitted on one of the multiple carriers.

In accordance with an aspect of the present invention, a method for transmitting a power headroom (PH) report by a terminal in a mobile communication system supporting carrier aggregation is provided. The method includes determining a first maximum transmission power for a first serving cell of multiple activated serving cells based on uplink transmission of at least one other serving cell if the first serving cell transmits a physical uplink shared channel (PUSCH), determining a second maximum transmission power for a first serving cell of the multiple activated serving cells without consideration of uplink transmission of at least one other serving cell if the first serving cell does not transmit a PUSCH, calculating a PH for the first serving cell based on the first maximum transmission power or the second maximum transmission power, and transmitting, to a base station, an extended PH report including respective calculated PHs of the multiple activated serving cells on one of the multiple activated serving cells.

In accordance with another aspect of the present invention, a method for receiving power headroom (PH) report by a base station in a mobile communication system supporting carrier aggregation is provided. The method includes receiving an extended power headroom report (PHR) including respective calculated PHs of the multiple activated serving cells on one of the multiple activated serving cells. A PH of a first serving cell of the multiple activated serving cells is calculated based on a first maximum transmission power or a second maximum transmission power, the first maximum transmission power is determined based on uplink transmission of at least one other serving cell, if the first serving cell transmits a physical uplink shared channel (PUSCH), and the second maximum transmission power is determined without consideration of uplink transmission of at least one other serving cell, if the first serving cell does not transmit a PUSCH.

In accordance with another aspect of the present invention, an apparatus for transmitting a power headroom (PH) report of a terminal in a mobile communication system supporting carrier aggregation is provided. The apparatus includes a transceiver and a controller. The transceiver is configured to transmit and receive a signal. The controller is configured to determine a first maximum transmission power for a first serving cell of multiple activated serving cells based on uplink transmission of at least one other serving cell if the first serving cell transmits a physical uplink shared channel (PUSCH), to determine a second maximum transmission power for a first serving cell of the multiple activated serving cells without consideration of uplink transmission of at least one other serving cell if the first serving cell does not transmit a PUSCH, to calculate a PH for the first serving cell based on the first maximum transmission power or the second maximum transmission power, and to transmit, to a base station, an extended PH report including respective calculated PHs of the multiple activated serving cells on one of the multiple activated serving cells.

In accordance with another aspect of the present invention, an apparatus for receiving power headroom (PH) report of a base station in a mobile communication system supporting carrier aggregation is provided. The apparatus includes a transceiver and a controller. The transceiver is configured to transmit and receive a signal. The controller is configured to receive an extended power headroom report (PHR) including respective calculated PHs of the multiple activated serving cells on one of the multiple activated serving cells. A PH of a first serving cell of the multiple activated serving cells is calculated based on a first maximum transmission power or a second maximum transmission power, the first maximum transmission power is determined based on uplink transmission of at least one other serving cell, if the first serving cell transmits a physical uplink shared channel (PUSCH), and the second maximum transmission power is determined without consideration of uplink transmission of at least one other serving cell, if the first serving cell does not transmit a PUSCH.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method and apparatus for a User Equipment (UE) to report Power Headroom (PH) information efficiently in the mobile communication system supporting carrier aggregation. An exemplary mobile communication system to which an exemplary embodiment of the present invention is applied is described below with reference to FIGS. 1 to 3. The description is directed to a Long Term Evolution (LTE) system, but other wireless communication technologies may also be employed.

Figure 1:
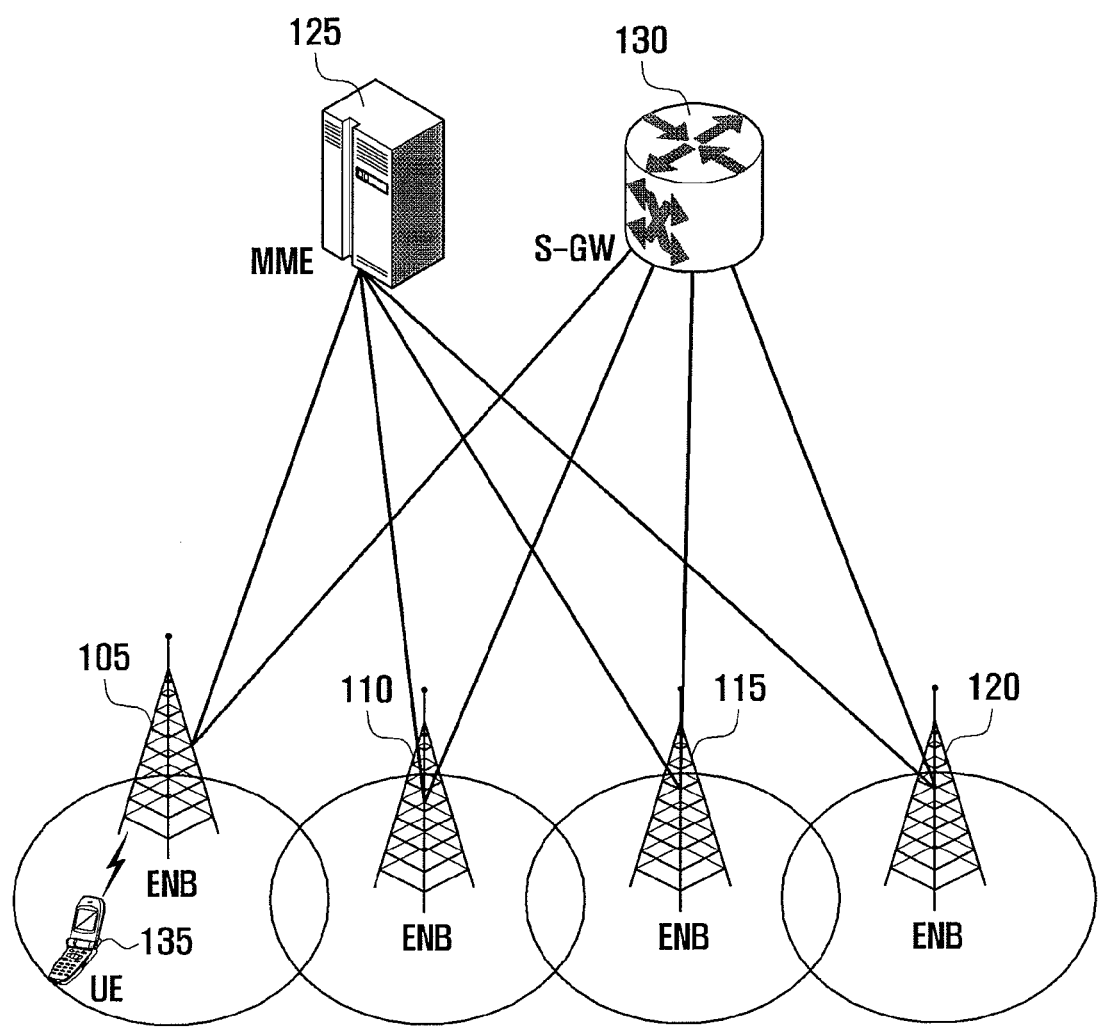
FIG. 1 is a diagram illustrating an architecture of a mobile communication system according to an exemplary embodiment of the present invention.

FIG. 1 is a diagram illustrating an architecture of a mobile communication system according to an exemplary embodiment of the present invention.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The UE 135 connects to an external network via eNBs 105, 110, 115, and 120 and the S-GW 130.

The eNBs 105, 110, 115, and 120 correspond to legacy node Bs of Universal Mobile Communications System (UMTS). The eNBs 105, 110, 115, and 120 allow the UE establish a radio link and are responsible for complicated functions as compared to the legacy node B. In the LTE system, all user traffic, including real time services such as Voice over Internet Protocol (VoIP), is provided through a shared channel and thus there is a need of a device which is located in the eNB to schedule data based on the state information of the UEs. In order to implement a data rate of up to 100 Mbps, the LTE system adopts Orthogonal Frequency Division Multiplexing (OFDM) as a radio access technology. The LTE system adopts Adaptive Modulation and Coding (AMC) to determine the modulation scheme and channel coding rate according to the channel condition of the UE.

S-GW 130 is an entity to provide data bearers so as to establish and release data bearers under the control of the MME 125. MME 125 is responsible for various control functions and is connected to the eNBs 105, 110, 115, and 120.

Figure 2:
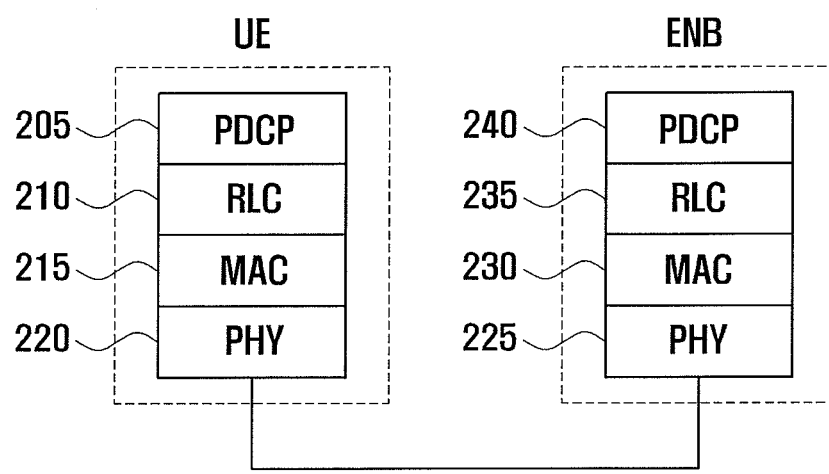
FIG. 2 is a diagram illustrating a protocol stack of a mobile communication system according to an exemplary embodiment of the present invention.

FIG. 2 is a diagram illustrating a protocol stack of the mobile communication system according to an exemplary embodiment of the present invention.

Referring to FIG. 2, the protocol stack of the LTE system includes Packet Data Convergence Protocol (PDCP) layer 205 and 240, Radio Link Control (RLC) layer 210 and 235, Medium Access Control (MAC) layer 215 and 230, and Physical (PHY) layer 220 and 225. The PDCP layer 205 and 240 is responsible for Internet Protocol (IP) header compression/decompression. The RLC layer 210 and 235 is responsible for segmenting the PDCP Protocol Data Unit (PDU) into segments in a size appropriate for Automatic Repeat Request (ARQ) operation. The MAC layer 215 and 230 is responsible for establishing connections to a plurality of RLC entities so as to multiplex the RLC PDUs into MAC PDUs and demultiplex the MAC PDUs into RLC PDUs. The PHY layer 220 and 225 performs channel coding on the MAC PDU and modulates the MAC PDU into OFDM symbols to transmit over a radio channel, or performs demodulating and channel-decoding on the received OFDM symbols and delivers the decoded data to a higher layer. The data input to a protocol entity is referred to as Service Data Unit (SDU), and the data output by the protocol entity is referred to as a PDU.

Figure 3:
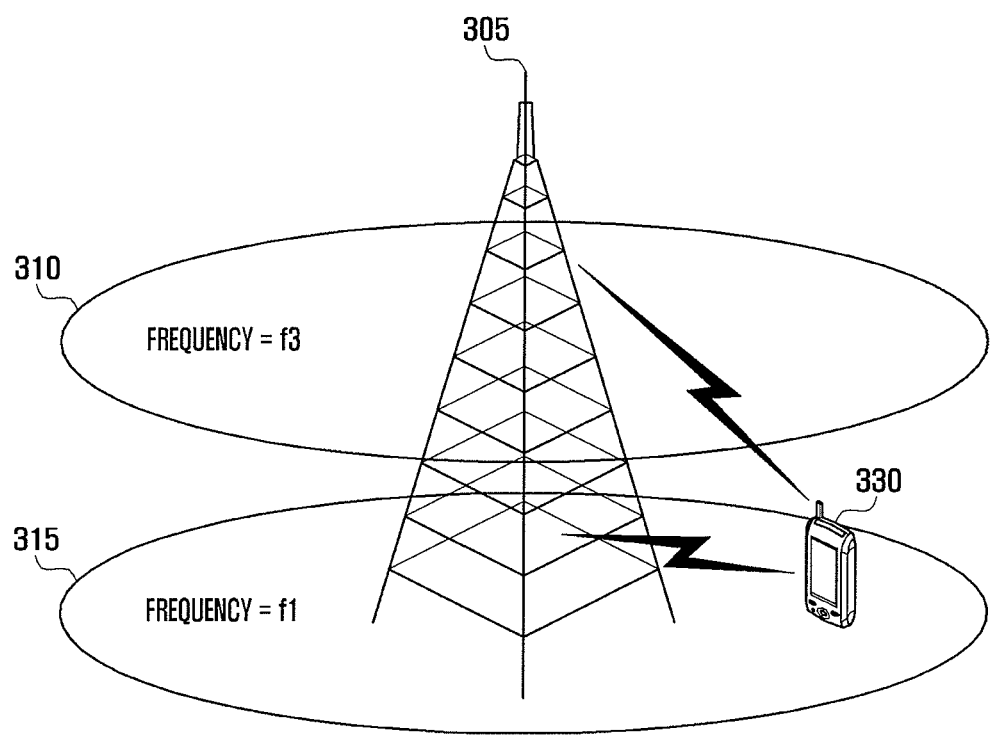
FIG. 3 is a diagram illustrating an exemplary situation of carrier aggregation in a mobile communication system according to an exemplary embodiment of the present invention.

FIG. 3 is a diagram illustrating an exemplary situation of carrier aggregation in the mobile communication system according to an exemplary embodiment of the present invention.

Referring to FIG. 3, an eNB typically uses multiple carriers transmitted and received in different frequency bands. For example, the eNB 305 may be configured to use the carrier 315 with center frequency f1 and the carrier 310 with center frequency f3. If carrier aggregation is not supported, the UE 330 transmits/receives data using just one of the carriers 310 and 315. However, the UE 330 having the carrier aggregation capability may transmit/receive data using both the carriers 310 and 315.

The eNB may increase the amount of resources to be allocated to the UE having the carrier aggregation capability according to the channel condition of the UE so as to improve the data rate of the UE. If a cell is configured with one downlink carrier and one uplink carrier, the carrier aggregation can be understood as if the UE communicates data via multiple cells. With the use of carrier aggregation, the maximum data rate increases in proportion to the number of aggregated carriers. The aggregated carriers are configured via Radio Resource Control (RRC) signaling. In LTE, it is possible to add or remove a carrier to or from the carrier aggregation using an RRCConnectionReconfiguration message. Although a specific carrier is configured, data transmission is not performed yet. In order to use the corresponding carrier, the carrier is activated by MAC signaling. In LTE, the configured carrier is activated by a MAC Control Element (CE) in the MAC PDU. Since the service is provided through the multiple activated carriers, multiple serving cells may exist.

In order to mitigate interference, the uplink transmission power may be maintained below an appropriate level. For this purpose, the UE calculates the uplink transmission power using a predetermined function and performs uplink transmission at the calculated uplink transmission power. For example, the UE calculates the required uplink transmission power value by inputting the input values such as the scheduling information including resource amount and Modulation and Coding Scheme (MCS) allocated to the UE and information necessary for estimating the channel condition such as path loss, and performs uplink transmission by applying the calculated uplink transmission power value. The available uplink transmission power value of the UE is limited to the maximum transmission power value of the UE such that when the calculated transmission power value exceeds the maximum transmission power value, the UE performs the uplink transmission at the maximum transmission power. In this case, the uplink transmission power is not enough, resulting in uplink transmission quality degradation. Accordingly, the eNB may perform scheduling such that the required transmission power does not exceed the maximum transmission power. However, since a few parameters such as path loss cannot be determined by the eNB, the UE reports its PH value to the eNB by means of a PHR.

Several factors influence PH, including 1) allocated transmission resource amount, 2) MCS to be applied to uplink transmission, 3) Path Loss (PL) of the related downlink carrier, and 4) accumulated value of transmission power control command. The Path Loss and accumulated transmission power control command value are variable according to the uplink carrier such that, when multiple uplink carriers are aggregated, the transmission of the PHR may be configured per carrier. In order to transmit the PHR efficiently, it can be advantageous to report the PHs of all the uplink carriers on one uplink carrier. Depending on the management policy, it may be necessary to transmit the PH of the carrier on which no Physical Uplink Shared Channel (PUSCH) transmission actually takes place. In this case, it may be more efficient to report the PHs of the multiple uplink carriers on a single uplink carrier. For this purpose, it is necessary to extend the PHR. The multiple PHs to be contained in a PHR can be arranged in a predetermined order.

Figure 4:
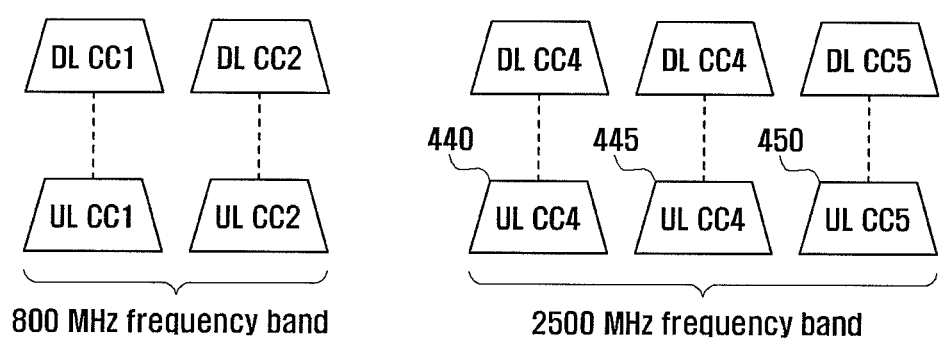
FIG. 4 is a conceptual diagram illustrating a principle of carrier aggregation for use in a mobile communication according to an exemplary embodiment of the present invention.

FIG. 4 is a conceptual diagram illustrating a principle of carrier aggregation for use in the mobile communication according to an exemplary embodiment of the present invention.

Figure 5:
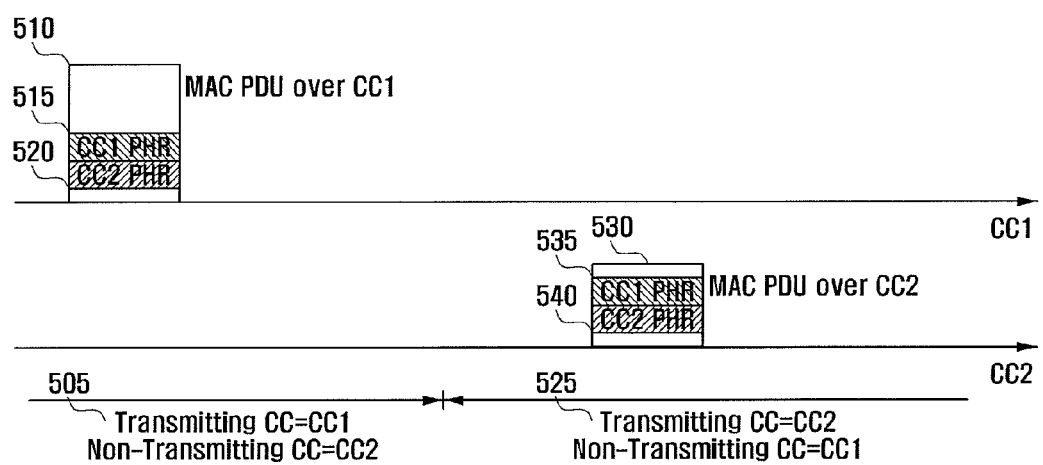
FIG. 5 is a diagram illustrating an exemplary scenario of Power Headroom (PH) reporting according to an exemplary embodiment of the present invention.

Referring to FIGS. 4, 5 uplink carriers can be aggregated for the UE, and one of the aggregated carriers can be selected to transmit the PHs for the 5 uplink carriers. For example, when three uplink carriers 440, 445, and 450 are aggregated for the UE, a PHR can be configured to carry the PHs for the three uplink carriers.

A PHR is triggered when the path loss of the connected downlink carrier is equal to or greater than a predetermined threshold value, a prohibit PHR time expires, or a predetermined time period elapses after the last PHR generation. Once PHR has triggered, the UE waits until the time available for the uplink transmission arrives, e.g., the time for which the uplink transmission resource is allocated, rather than transmit the PHR immediately. This is because PHR is not time-sensitive information. The UE transmits PHR at the first uplink transmission. PHR is the MAC layer control information and has the length of 8 bits. The first two bits of PHR are reserved for future use, and the remaining 6 bits are used to indicate the value in the range between −23 dB and 40 dB as the power headroom of the UE. The UE calculates the PH using the following Equation 1:

$$PH(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \quad 1$$

The PH(i) of the $i^{th}$ subframe in the serving cell c is calculated with the maximum uplink transmission power $P_{CMAX,c}(i)$, number of resource blocks $M_{PUSCH,c}(i)$, power offset derived from MCS $\Delta_{TF,c}$, Path Loss $PL_c$, and accumulated Transmission Power Control (TPC) commands $f_c(i)$. In Equation 1, $PL_c$ denotes the pass loss of a cell which provides the information on the path loss in the service cell c. The path loss used to determine uplink transmission power of a certain serving cell is the path loss of the downlink channel of the corresponding cell or the path loss of a downlink channel of another cell. The cell of which path loss is to be used is selected by the eNB and notified to the UE in the call setup process.

In Equation 1, $f_c(i)$ is the accumulated value of the accumulated TPC commands of the serving cell c. $P_{O\_PUSCH,C}$ denotes a higher layer parameter corresponding to the sum of cell-specific and UE-specific values. Typically, $P_{O\_PUSCH,C}$ is set to a value determined according to the transmission type of PUSCH, such as the semi-persistent scheduling, dynamic scheduling, and random access response. $\alpha_c$ denotes a 3-bit cell specific value provided from a higher layer as the weight applied to the path loss when calculating uplink transmission power (i.e., the higher this value, the more the path loss influences the uplink transmission power), and its value is limited according to the transmission type of the PUSCH. j denotes the transmission type of the PUSCH. The parameter j is set to 0 for semi-persistent scheduling, 1 for dynamic scheduling, and 2 for random access response. If there is no PUSCH transmission, $M_{PUSCH}$ and $\Delta_{TF}$ are not applied to the Equation 1.

In a mobile communication system supporting carrier aggregation, there can be a serving cell in which no PUSCH transmission takes place and a serving cell in which PUSCH transmission takes place. The PH for a serving cell may be reported in another serving cell. In the mobile communication system supporting carrier aggregation, when it is necessary to report the PHs of multiple serving cells, the UE may transmit the PHs in a single PHR. This method is advantageous to reduce the signaling overhead as compared to the method transmitting the PHs individually, and the eNB can acquire the PH for the carrier on which no PUSCH is transmitted.

FIG. 5 is a diagram illustrating an exemplary scenario of PH reporting according to an exemplary embodiment of the present invention.

Referring to FIG. 5, a scenario is shown in which each of two serving cells CC1 and CC2 transmits the PHs of both the serving cells. In the time duration 505 for which PUSCH transmission takes place in CC1 but not in CC2, the UE can transmit MAC PDU 510 containing the CC1 PH 515 and CC2 PH 520. In the time duration 525 for which PUSCH transmission takes place in CC2 but not in CC1, the UE can transmit MAC PDU 530 containing the CC1 H 535 and CC2 PH 640.

Although no PUSCH is transmitted, the eNB may trigger PHR to acquire the path loss information on a specific uplink carrier. Accordingly, exemplary embodiments of the present invention include a method for calculating PH for the carrier carrying no PUSCH and a PHR format which allows the eNB to identify the PH.

When PHR is triggered for a specific serving cell, the UE determines the method for calculating the PH value according to whether the PUSCH is transmitted on the corresponding carrier. If PUSCH transmission takes place in the corresponding serving cell, the PH is calculated using Equation 1 as specified for a normal process. If no PUSCH transmission takes place in the corresponding serving cell, this means no resource is allocated for transmission such that the values of $M_{PUSCH}$ and $\Delta_{TF}$ are apparent. Accordingly, there is a need of a device which allows the eNB and UE to calculate and interpret the PH using the same $M_{PUSCH}$ and $\Delta_{TF}$. This goal can be addressed by defining a transmission format (transmission resource amount and MCS level) to be used for PH calculation on the carrier carrying no PUSCH. Assuming one Resource Block (RB) and lowest MCS level as the reference transmission format, $M_{PUSCH}$ and $\Delta_{TF}$ become 0 so as to be able to be omitted in Equation 1. Since no data transmission takes place in the corresponding serving cell, $P_{CMAX,c}(i)$ does not exist. Accordingly, the value of $P_{CMAX,c}(i)$ should be determined. According to an exemplary embodiment of the present invention, a virtual $P_{CMAX,c}(i)$ is defined and applied for such virtual transmission. $P_{CMAX,c}(i)$ may be determined using the maximum allowed transmission power $P_{EMAX}$ and the immanent maximum transmission power of the UE $P_{PowerClass}$. For example, $P_{CMAX,c}(i)$ can be determined according to Equation 2.

$$P_{CMAX,c} = \min\{P_{EMAX}, P_{PowerClass}\} \quad 2$$

This has the same meaning that MPR, A-MPR, P-MPR, and $T_C$ are all set to 0. $P_{CMAX}$ is determined in the relationship of $P_{CMAX\_L} \leq P_{CMAX} \leq P_{CMAX\_H}$. If all of MPR, A-MPR, P-MPR, and $T_C$ are set to 0, $P_{CMAX\_L}$ becomes equal to $P_{CMAX\_H}$, resulting in $P_{CMAX} = P_{CMAX\_H}$. $P_{CMAX\_H}$ is the one having the least value among $P_{PowerClass}$ and $P_{EMAX}$. $P_{EMAX}$ is the cell-specific maximum allowed transmission power and $P_{PowerClass}$ is the UE-specific Maximum allowed transmission power. Accordingly, when no PUSCH transmission takes place in the serving cell, PH is defined by Equation 3:

$$PH(i) = \min\{P_{EMAX}, P_{PowerClass}\} - \{P_{O\_PUSCH,c}(j) + a_c(j) \cdot PL_c + f_c(i)\} \quad 3$$

In Equation 3, the values of the corresponding serving cells for which PHs are calculated but not transmitted are determined with the $P_{O\_PUSCH,C}$, $\alpha_c$, $f_c(i)$, $PL_c$. The PH calculated by Equation 3 is reported to the eNB along with other PHs transmitted in another serving cell. In view of eNB, it is possible to check the PHs for multiple serving cells with one PHR. One problem is that the eNB does not know whether each of the per-cell PHs contained in the PHR is calculated according to PUSCH transmission and by using the PUSCH reference format according to an exemplary embodiment of the present invention. Without such information, the eNB may not be able to interpret the reported PHs correctly, resulting in failure of efficient scheduling. In order to address this issue, an indicator for indicating the PUSCH transmission and use of the proposed PUSCH reference format is included in the PHR. The indicator is added for PH per activated serving cell. This indicator may be implemented with 1 bit. When calculating PH of a certain cell, if the PH is calculated under the assumption of PUSCH transmission, i.e., using the actual transmission format, the UE sets the corresponding bit to a predetermined value (e.g., 0). If PH is calculated using the reference format (i.e., number of RBs=0 and $\Delta_{TF}$=0), the UE sets the corresponding bit to a predetermined value (e.g., 1).

Figure 6:
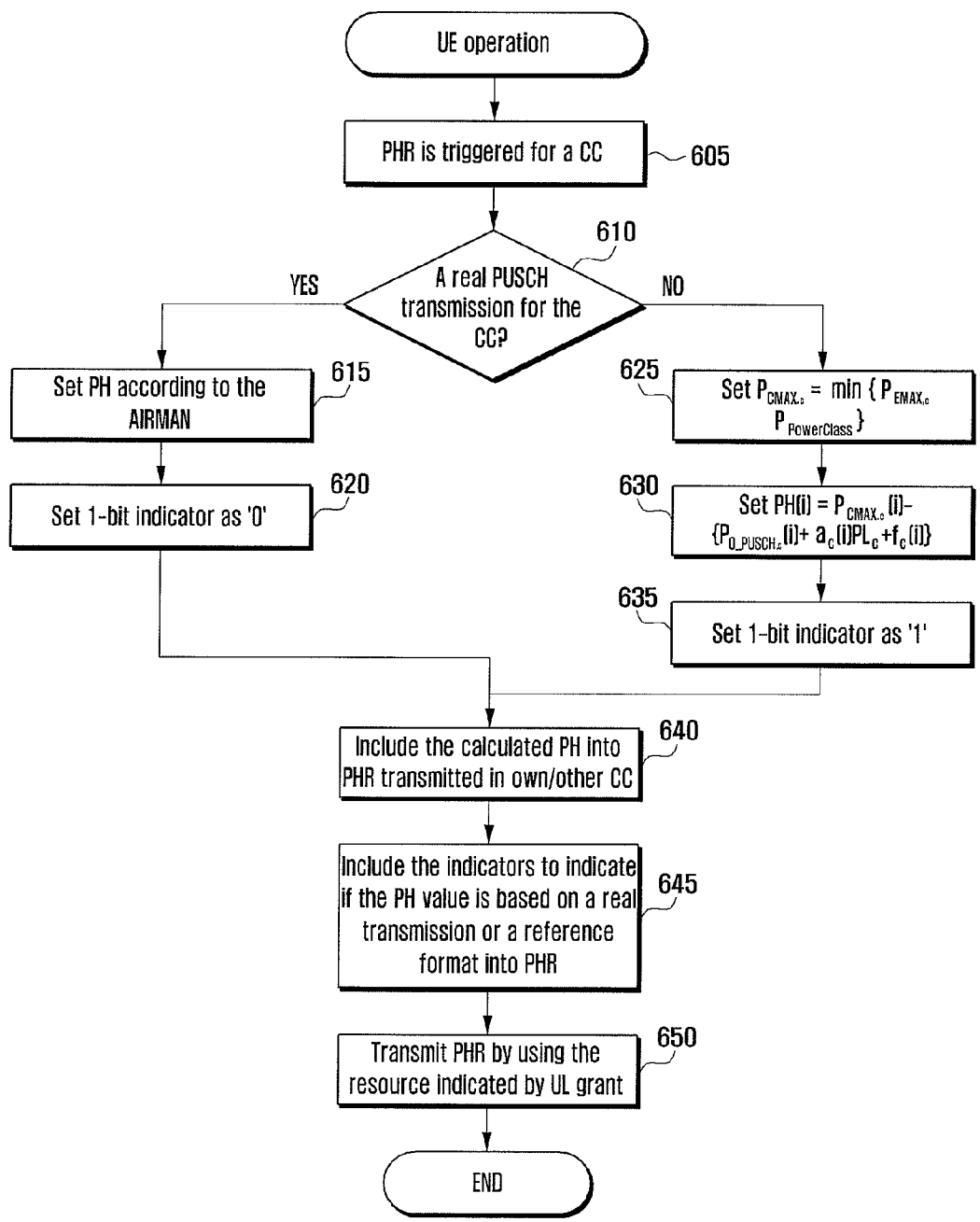
FIG. 6 is a flowchart illustrating a PH reporting procedure of a User Equipment (UE) according to an exemplary embodiment of the present invention.

FIG. 6 is a flowchart illustrating a PH reporting procedure of a UE according to an exemplary embodiment of the present invention.

Referring to FIG. 6, the UE detects a PHR trigger for a specific serving cell in step 605. PHR can be triggered when the path loss of the linked downlink carrier becomes equal to or greater than a predetermined value or periodically at a predetermined PHR period. Once the PHR trigger is detected, the UE determines whether the real PUSCH transmission takes place in the corresponding serving cell in step 610.

If the real PUSCH transmission takes place in the corresponding serving cell, the UE calculates PH according to a typical method in step 615. The UE calculates PH for the corresponding cell using Equation 1. The UE sets the PH type indicator so as to indicate that PH is calculated according to the typical method in step 620. According to an exemplary embodiment of the present invention, the PH type indicator is 1 bit and set to 0 for indicating the use of the normal PH method. Since PUSCH transmission takes place in the corresponding serving cell, the UE places the calculated PH in the PHR to be transmitted in the corresponding serving cell in step 640, and places the transmission format indicator indicating the use of real $P_{CMAX}$ for the corresponding PH in the PHR in step 645. Finally, the UE transmits the PHR in the corresponding cell in step 650. If necessary, the PH can be transmitted in another serving cell.

Otherwise, if no PUSCH transmission takes place in the corresponding serving cell, the UE calculates PH using the PH calculation equation according to an exemplary embodiment of the present invention in steps 625 and 630. In step 625, $P_{CMAX}$ is calculated with only the $P_{EMAX}$ and $P_{PowerClass}$ omitting the parameters related to real PUSCH transmission. In step 630, PH is calculated with $P_{CMAX}$ derived at step 625 and reference transmission format excluding the parameters related to the real PUSCH transmission. After calculating PH, the UE sets the PH type indicator to 1 for the corresponding cell so as to indicate that the PH of the corresponding cell is derived based on the reference transmission format in step 635. If no PUSCH transmission takes place in the corresponding serving cell, this means that the PHR cannot be transmitted in the corresponding cell. Accordingly, the PH is carried in the PHR transmitted in other cell of the eNB. Accordingly, the UE places the calculated PH in the PHR to be transmitted in the other serving cell at step 640. The UE places the transmission format indicator indicating the use of virtual $P_{CMAX}$ for the corresponding PH in the PHR in step 645. Finally, the UE transmits the PHR in the other serving cell.

According to an exemplary embodiment of the present invention, the UE reports the PHs for multiple carriers using an extended PHR in the mobile communication system supporting carrier aggregation. The UE calculates the PH for each of the activated carriers according to whether the real PUSCH transmission takes place thereon. If the real PUSCH transmission takes place, the UE calculates the PH using Equation 1. If no PUSCH transmission takes place, the UE calculates the PH using Equation 3, i.e. using a predetermined reference format. The UE calculates the PH under the assumption that the number of resource blocks allocated in PUSCH $M_{PUSCH}$ and the power offset $A_{TF}$ are 0. The UE sets the transmission format indicators for indicating whether the real PUSCH transmissions take place in the corresponding cells. If the PUSCH transmission takes place, the UE sets the transmission format indicator to 0. If no PUSCH transmission takes place, the UE sets the transmission format indicator to 1. The UE generates the extended PHR containing the PHs and indicators and transmits the extended PHR on one of the carriers.

Figure 7:
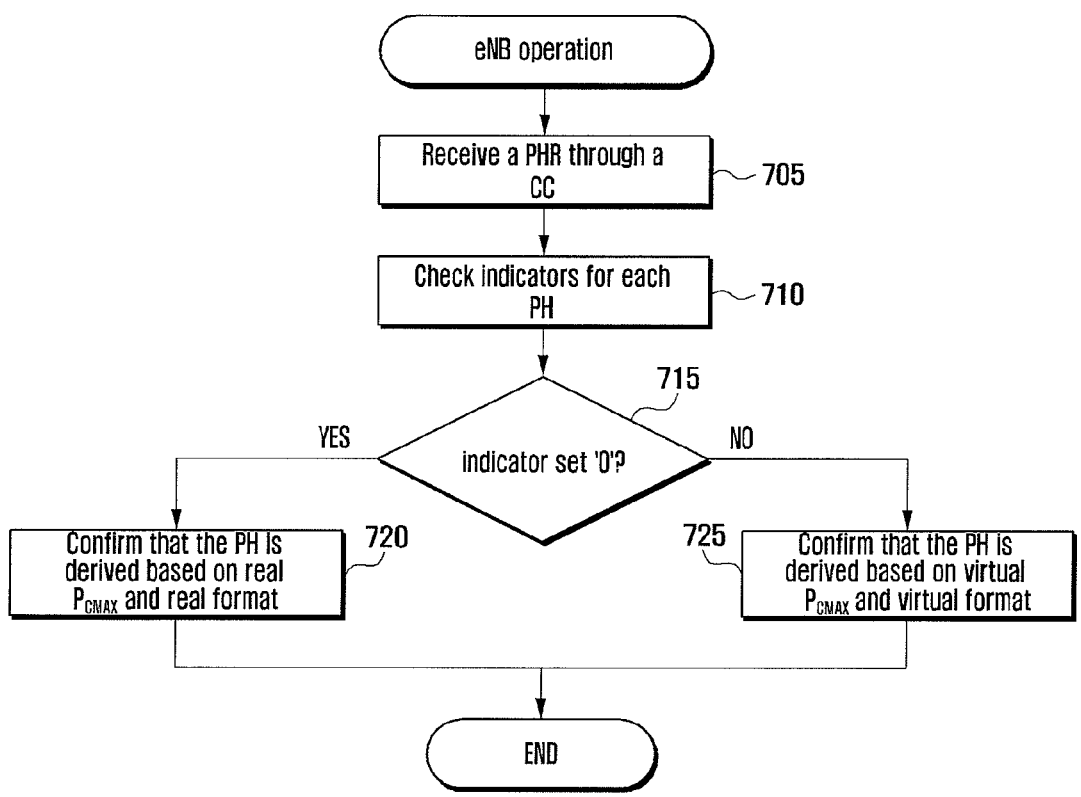
FIG. 7 is a flowchart illustrating a PH reception procedure of an evolved Node B (eNB) according to an exemplary embodiment of the present invention.

FIG. 7 is a flowchart illustrating a PH reception procedure of an eNB according to an exemplary embodiment of the present invention.

Referring to FIG. 7, the eNB receives a PHR from a UE in one of a plurality of serving cells in step 705. The PHR may include the PHs for the current and other serving cells. The PH for the serving cell in which no PUSCH transmission takes place may be included in the PHR. In order to differentiate between the PHs for the serving cell in which PUSCH transmission takes place and the serving cell in which no PUSCH transmission takes place, the eNB checks the transmission format indicators for individual PHs in step 710. If the transmission format indicator is set to 0, the PH is calculated using the real $P_{CMAX}$ for the serving cell in which the real PUSCH transmission takes place. If the transmission format indicator is set to 1, the PH is calculated using the virtual $P_{CMAX}$ for the serving cell in which on PUSCH transmission takes place. After checking the transmission format indicator, the eNB determines whether the transmission format indicator is set to 0 in step 715. If the transmission format indicator is set to 0, the eNB determines that the PH is calculated with the real $P_{CMAX}$ in step 720. This PH is used for scheduling the UE and channel estimation. If the transmission format indicator is set to 1, the eNB determines that the PH is calculated with the virtual $P_{CMAX}$ in step 725. This PH is used to predict the PL and estimate channel.

According to an exemplary embodiment of the present invention, if an extended PHR is received from a UE, the eNB uses the extended PHR to determine uplink transmission power. The eNB includes a transceiver and a controller. The transceiver receives the extended PHR composed of the PHs for a plurality of carriers and indicators corresponding to the PHs, the extended PHR being transmitted on one of the plural activated carriers. The controller determines whether the PUSCH transmission takes place on each of the carriers. If the transmission format indicator is set to 0, the controller determines that the PH is of the carrier on which PUSCH transmission takes place. If the PUSCH transmission takes place on the carrier the PH is calculated using Equation 1. If the transmission format indicator is set to 1, the controller determines that the PH is of the carrier on which no PUSCH transmission takes place. If no PUSCH transmission takes place on the carrier, this means that the PH is calculated using Equation 3, i.e., calculated according to a predetermined reference format. In this manner, the controller determines the uplink transmission powers for the respective carriers based on the PHs according to whether PUSCH transmission takes place on the respective carriers.

Figure 8:
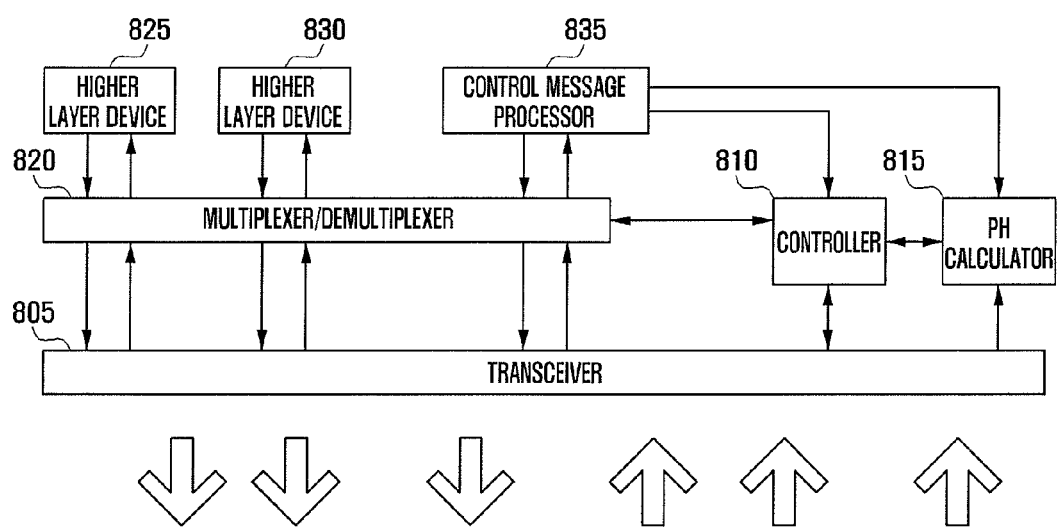
FIG. 8 is a block diagram illustrating a configuration of a PH reporting apparatus of the UE according to an exemplary embodiment of the present invention.

FIG. 8 is a block diagram illustrating a configuration of a PH reporting apparatus of the UE according to an exemplary embodiment of the present invention.

Referring to FIG. 8, the UE includes a transceiver 805, a PH calculator 815, a controller 810, a multiplexer/demultiplexer 820, a control message processor 835, and various higher layer devices 825 and 830. The UE may include additional units (such as a display unit, input unit, and the like) not shown here for purposes of clarity. Similarly, the functionality of two or more of the above units may be integrated into a single component.

One or more of the units of the UE may be implemented as a software component. Similarly, a unit may be implemented entirely as a hardware (such as one or more processors) or as a combination of hardware and software components. However, it would be understood that at least some of the units would need to be implemented at least partially as a hardware components in order to carry out their function.

The transceiver 805 receives data and control signals on the downlink carriers and transmits data and control signals on the uplink carriers. When a plurality of carriers is aggregated, the transceiver 805 may transmit/receive the data and control signals over a plurality of carriers.

The PH calculator 815 calculates PH according to the control signal from the controller 810 and sends the PH to the controller 810. When a plurality of carriers is aggregated, the PH calculator 815 can calculate PHs for the respective carriers. The PH calculator 815 calculates the PHs for the carriers according to whether PUSCH transmission takes place on each carrier. If the PUSCH transmission takes place, the PH calculator 815 calculates the PH according to a normal method. If no PUSCH transmission takes place, the PH calculator 815 calculates the PH with a predetermined reference format. The PH calculator 815 derives the PH using a virtual $P_{CMAX}$ for the carrier on which no PUSCH transmission takes place according to an exemplary embodiment of the present invention.

The controller 810 controls the multiplexer/demultiplexer 820 to generate MAC PDUs according to the control signal received by means of the transceiver 805, e.g. the scheduling information in the uplink grant. The controller detects the PHR trigger. If a PHR trigger is detected, the controller 810 controls the PH calculator 815 to calculate the PH. Whether PHR is triggered can be determined according to the PHR parameter provided by the control message processor 835. If the PHs of multiple uplink carriers are configured into a PHR, the controller 810 controls the multiplexer/demultiplexer 820 to place in the MAC PDU an indicator indicating whether the PH for each carrier is derived from real $P_{CMAX}$ or virtual $P_{CMAX}$. The controller 810 generates the PHR with the PHs provided by the PH calculator 815 and sends the PHR to the multiplexer/demultiplexer 820. If multiple carriers are aggregated, the controller 810 may report the PHs using an extended PHR configured according to an exemplary embodiment of the present invention. The controller 810 may configure the PHs of the multiple carriers into the extended PHR along with the transmission format indicators corresponding to the PHs. The controller 810 may transmit the extended PHR on one of the multiple carriers.

The multiplexer/demultiplexer 820 multiplexes the data from the higher layer devices 825 and 830 and/or control message processor 835 and demultiplexes the data received by the transceiver 805 to the higher layer devices 825 and 830 and/or the control message processor 835.

The control message processor 835 processes the control message transmitted by the network and takes a necessary action. The control message processor 835 forwards the PHR parameter carried in the control message to the controller 810 or the information on the newly activated carriers to the transceiver 805 to set the carriers. The higher layer devices 825 and 830 may be implemented for the respective services so as to deliver the data generated by the user service such as File Transfer Protocol (FTP) and VoIP to the multiplexer/demultiplexer 820 or process and deliver the data form the multiplexer/demultiplexer 820 to the service applications of the higher layer.

As described above, the PH reporting method and apparatus for a mobile communication system supporting carrier aggregation according to exemplary embodiments of the present invention enables efficient reporting or the PH per carrier. If multiple carriers are aggregated, the UE can configure the PHs for the multiple carriers into a PHR. By using the per-carrier PHs transmitted in aggregated manner, it is possible to determine the uplink transmission power more efficiently in the mobile communication system supporting carrier aggregation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a terminal for transmitting a power headroom (PH) report in a mobile communication system supporting carrier aggregation, the method comprising:
    determining a first maximum transmission power for a first serving cell of multiple activated serving cells based on uplink transmission of at least one other serving cell if the first serving cell transmits a physical uplink shared channel (PUSCH);
    determining a second maximum transmission power for the first serving cell of the multiple activated serving cells without consideration of uplink transmission of the at least one other serving cell if the first serving cell does not transmit the PUSCH;
    calculating a PH for the first serving cell based on the first maximum transmission power or the second maximum transmission power; and
    transmitting, to a base station, an extended PH report (PHR) including respective calculated PHs of the multiple activated serving cells on one of the multiple activated serving cells.

2. The method of claim 1, wherein the respective calculated PHs are arranged in a predetermined order in the extended PHR.

3. The method of claim 1, wherein the determining of the second maximum transmission power is based on a reference format.

4. The method of claim 3, wherein the calculating of the PH for the first serving cell based on the second maximum transmission power comprises calculating the PH under an assumption that a number of resource blocks and power offset are "0".

5. The method of claim 3, wherein the calculating of the PH for the first serving cell based on the second maximum transmission power comprises calculating the PH under an assumption that a value of addition maximum power reduction (A-MRP) is "0".

6. A method of a base station for receiving power headroom (PH) report in a mobile communication system supporting carrier aggregation, the method comprising:
    receiving an extended power headroom report (PHR) including respective calculated PHs of the multiple activated serving cells on one of the multiple activated serving cells,
    wherein a PH of a first serving cell of the multiple activated serving cells is calculated based on a first maximum transmission power or a second maximum transmission power,
    wherein the first maximum transmission power is determined based on uplink transmission of at least one other serving cell, if the first serving cell transmits a physical uplink shared channel (PUSCH), and
    wherein the second maximum transmission power is determined without consideration of uplink transmission of the at least one other serving cell, if the first serving cell does not transmit the PUSCH.

7. The method of claim 6, wherein the respective calculated PHs are arranged in a predetermined order in the extended PHR.

8. The method of claim 6, wherein the second maximum transmission power is determined based on a reference format.

9. The method of claim 8, wherein the PH for the first serving cell is calculated under an assumption that a number of resource blocks and power offset are "0", if the PH is calculated based on the second maximum transmission power.

10. The method of claim 8, wherein the PH for the first serving cell is calculated under an assumption that a value of addition maximum power reduction (A-MRP) is "0", if the PH is calculated based on the second maximum transmission power.

11. A terminal for transmitting a power headroom (PH) report of a terminal in a mobile communication system supporting carrier aggregation, the terminal comprising:
a transceiver configured to transmit and receive a signal; and
a controller configured to:
determine a first maximum transmission power for a first serving cell of multiple activated serving cells based on uplink transmission of at least one other serving cell if the first serving cell transmits a physical uplink shared channel (PUSCH),
determine a second maximum transmission power for the first serving cell without consideration of uplink transmission of the at least one other serving cell if the first serving cell does not transmit the PUSCH,
calculate a PH for the first serving cell based on the first maximum transmission power or the second maximum transmission power, and
transmit, to a base station, an extended PH report (PHR) including respective calculated PHs of the multiple activated serving cells on one of the multiple activated serving cells.

12. The terminal of claim 11, wherein the respective calculated PHs are arranged in a predetermined order in the extended PHR.

13. The terminal of claim 11, wherein the determining of the second maximum transmission power is based on a reference format.

14. The terminal of claim 13, wherein the controller is further configured to calculate, if the PH for the first serving cell is calculated based on the second maximum transmission power, the PH under an assumption that a number of resource blocks and power offset are "0".

15. The terminal of claim 13, wherein the controller is further configured to calculate, if the PH for the first serving cell is calculated based on the second maximum transmission power, the PH under an assumption that a value of addition maximum power reduction (A-MRP) is "0".

16. A base station for receiving power headroom (PH) report of a base station in a mobile communication system supporting carrier aggregation, the base station comprising:
a transceiver configured to transmit and receive a signal; and
a controller configured to receive an extended power headroom report (PHR) including respective calculated PHs of the multiple activated serving cells on one of the multiple activated serving cells,
wherein a PH of a first serving cell of the multiple activated serving cells is calculated based on a first maximum transmission power or a second maximum transmission power,
wherein the first maximum transmission power is determined based on uplink transmission of at least one other serving cell, if the first serving cell transmits a physical uplink shared channel (PUSCH), and
wherein the second maximum transmission power is determined without consideration of uplink transmission of the at least one other serving cell, if the first serving cell does not transmit the PUSCH.

17. The base station of claim 16, wherein the respective calculated PHs are arranged in a predetermined order in the extended PHR.

18. The base station of claim 16, wherein the second maximum transmission power is determined based on a reference format.

19. The base station of claim 18, wherein the PH for the first serving cell is calculated under an assumption that a number of resource blocks and power offset are "0", if the PH is calculated based on the second maximum transmission power.

20. The base station of claim 18, wherein the PH for the first serving cell is calculated under an assumption that a value of addition maximum power reduction (A-MRP) is "0", if the PH is calculated based on the second maximum transmission power.

* * * * *